United States Patent Office 3,046,122
Patented July 24, 1962

3,046,122

PROCESS OF MAKING PRINTING PLATES AND LIGHT SENSITIVE MATERIAL SUITABLE FOR USE THEREIN

Oskar Süs, Wiesbaden-Biebrich, Germany, assignor, by mesne assignments, to Azoplate Corporation, Murray Hill, N.J.

No Drawing. Filed Mar. 3, 1958, Ser. No. 718,431
Claims priority, application Germany Aug. 1, 1950
55 Claims. (Cl. 96—33)

The present invention relates to the production of light-sensitive materials suitable for use in the graphic art. More particularly, it relates to a positive working photomechanical method for the manufacture of lithographic printing plates and to light-sensitive material suitable for use therein.

In the U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1)- or 1-diazo-naphthol-(2) and have the chemical constitution of esters or amides of a sulfo-acid or a carboxylic acid of these diazo naphthols are used to produce a light sensitive layer on a base material; this layer is then exposed to actinic light under a master pattern, and the image is developed with alkali and subsequently heated.

In the above cited patent application Serial No. 174,556 it has also been pointed out that it is possible to add resins or fatty acids to the diazo compounds or to apply such resins or fatty acids to the base material as an intermediate layer between the base and the light sensitive layer; the heating, furthermore, can be omitted and the process may also be carried out without the use of resins or fatty acids.

The U.S. patent applications Serial Nos. 202,403, filed December 22, 1950, and 208,055, filed January 26, 1951, both by Maximilian Paul Schmidt, all now abandoned, describe the use of other groups of diazo compounds that are insoluble in water and belong to the category of ortho-quinone diazides. For example, a water-insoluble diazo compound containing several, perferably two, naphthoquinone-(1,2)-diazide-sulfonic acid residues (ortho-diazo-naphthol-sulfonic acid residues) linked in the manner of an ester or an acid amide union, in the molecule may be used.

All the inventions covered by the above mentioned patent applications pertain to positive working processes or to the production of positives from positive master patterns or of negatives from negative master patterns.

It has now been found that diazo compounds which are derived from sulfonic acids of ortho-diazo-phenols of the benzene series also described in the literature as ortho-quinone-diazides (Beilstein, 4th edition, volume 16 (1933), pages 520 and 522/23) and which have the constitution of amides of these acids are particularly well suited for making photosensitive material for the production of printing plates according to the same general method as described in the applications referred to above.

The invention is particularly concerned with the new diazo compounds having the general formula

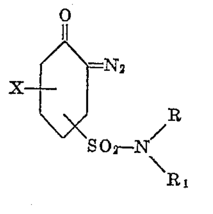

in which R is hydrogen, alkyl, substituted alkyl, aryl, substituted aryl, aralkyl, alkaryl, or a heterocyclic radical, $R_1$ is aryl, substituted aryl, aralkyl, alkaryl, or a heterocyclic radical, R and $R_1$ taken together forming a heterocyclic ring, and X is hydrogen, halogen, or a lower alkyl radical. Of these, the amides derived from ortho-benzoquinone-diazide-4-sulfonic acid are preferred for the production of printing plates.

A light sensitive layer of one of the new diazo compounds of the present invention, which are derived from ortho-quinone-diazides of the benzene series, may be prepared on a base in the manner described in the patent applications referred to above; e.g., the diazo compound may be dissolved in an organic solvent or in a mixture of several solvents and applied to a base material in known manner, for example, by whirl-coating, brushing or with the aid of rollers. Solvents with a boiling point between 70 to 100° C. are preferred. The solvents must have sufficient volatility, but on the other hand they must evaporate slowly enough to delay crystallization so that a uniform layer is formed on the base material. If the diazo compound has good general solubility, it will be easy to make a suitable selection from among the manifold solvents available. After coating, a thorough subsequent drying of the light-sensitive layer is advisable in order to remove the solvents entirely.

Sometimes the addition of resins to the coating solution is advisable in order to delay crystallization and/or to improve the adhesion of the light-sensitive layer to the base.

Metal plates or foils such as for example, those of aluminum and zinc are probably the best bases for these light-sensitive layers. It is not necessary to work with superficially oxidized metal foils which have been used in the graphic art for the production of flat-printing plates. Equally good results are obtained with metal foils having a mechanically roughened surface which may be produced by a simple process. Other base materials, as for example, glass or stone plates, may also be used.

After the sensitized base material has been exposed to a light image, it is developed by treating or wiping it with dilute, appropriately 1–5% solutions of preferably weak alkalies such as disodium phosphate or trisodiumphosphate. After a subsequent treatment with dilute acid the material is made ready for printing. The diazo compound remains at those areas of the base which are not struck by light and accepts the greasy lithographic printing ink so that positive ink receptive images are obtained from positive masters. With the aid of the printing machines used in planographic printing a large number of copies can be made in accord with commercial practice. If the printing plates must be subjected to high mechanical strains the image should be burned in by a short heating of the plate in a drying oven at about 250° C. Thereby a much better adhesion of the printing image to the metallic support is obtained and the number of copies which can be made is increased.

The following table contains some of the diazo compounds which may be used according to the present invention; these compounds are given merely by way of example.

(1) Benzoquinone - (1,2) - diazide - (2) - 4 - (N,N - diphenyl)-sulfonamide

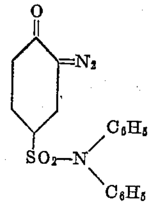

(2) Benzoquinone - (1,2) - diazide-(2)-4-(N-ethyl-N-β-naphthyl)-sulfonamide

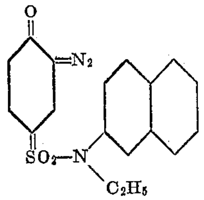

(3) N,N'-di-[benzoquinone-(1,2)-diazide - (2) - 4 - sulfonyl]-benzidine

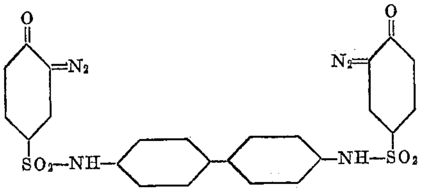

(4) N',N''-di - [benzoquinone-(1,2)-diazide-(2)-4-sulfonyl]-4',4''-diamino-benzophenone

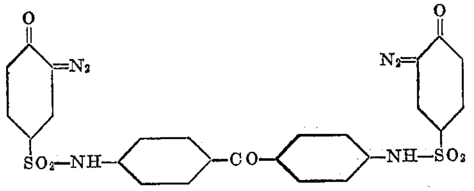

(5) N,N'-di-[benzoquinone-(1,2)-diazide - (2) - 4 - sulfonyl]-N,N'-dimethyl-p-phenylene-diamine

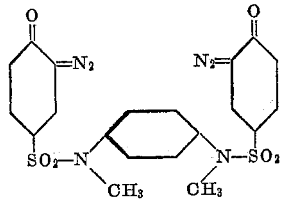

(6) N,N' - di - [benzoquinone - (1,2)-diazide-(2)-4-sulfonyl]-N,N'-dimethyl-benzidine

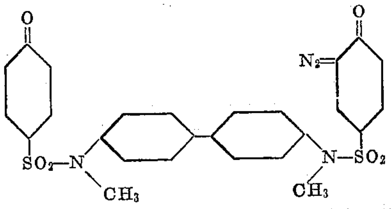

(7) Benzoquinone-(1,2)-diazide-(2)-5-methyl-4-(N,N-diphenyl)-sulfonamide

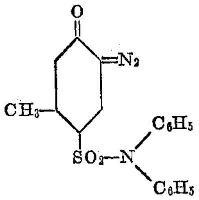

(8) Benzoquinone - (1,2) - diazide-(2)-5-methyl-4-(N-methyl-N-p-tolyl)-sulfonamide

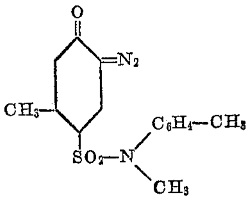

(9) Benzoquinone-(1,2)-diazide-(2)-6-methyl-4-(N,N'-diphenyl)-sulfonamide

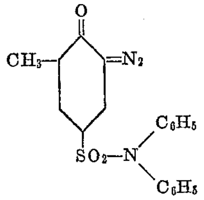

(10) Benzoquinone - (1,2)-diazide-(2)-6-methyl-4-(N-methyl-N-p-tolyl)-sulfonamide

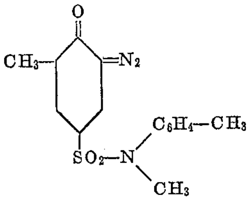

(11) Benzoquinone - (1,2) - diazide - (2)-4-chlor-6-(N-phenyl)-sulfonamide

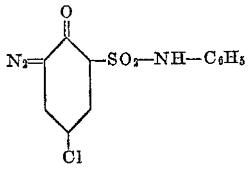

(12) Benzoquinone - (1,2)-diazide-(2)-4-chlor-6-(N-β-naphthyl)-sulfonamide

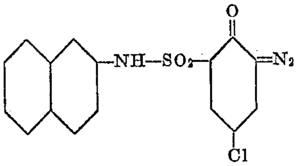

(13) Benzoquinone - (1,2) - diazide - (2)-4-chlor-6-(N-ethyl-N-phenyl)-sulfonamide

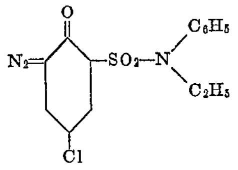

(14) N',N''-di-[benzoquinone-(1,2)-diazide-(2)-4-sulfonyl] - 4',4'' - diamino - 2',5',2'',5''-tetramethyltriphenylmethane

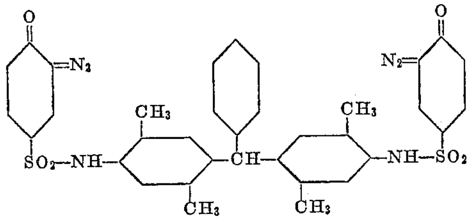

(15) Benzoquinone-(1,2)-diazide-(2)-4-(N-2'-fluorenyl)-sulfonamide

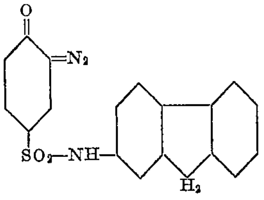

(16) N',N'' - di - [benzoquinone - (1,2) - diazide (2) - 4 - sulfonyl] - 4',4'' - diamino - diphenyl - (1', 1'')-cyclohexane

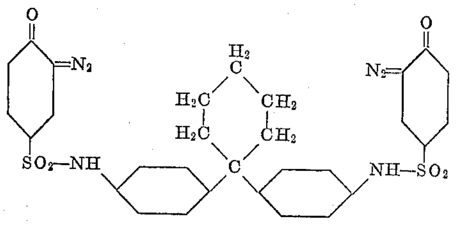

(17) N - (benzoquinone - (1,2) - diazide - (2) - 4 - sulfonyl)-benzimidazole

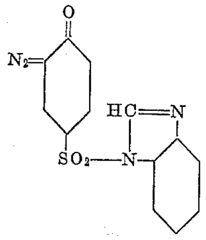

or

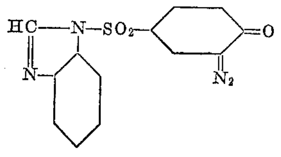

(18) N - (benzoquinone - (1,2) - diazide - (2) - 4 - sulfonyl)-2'-methyl-benzimidazole

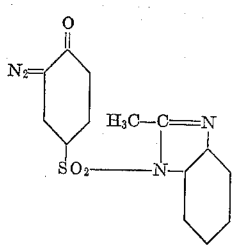

or

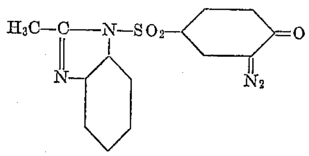

(19) N - (benzoquinone - (1,2) - diazide - (2) - 4 - sulfonyl)-1'',2'',4',5'-naphthoimidazole

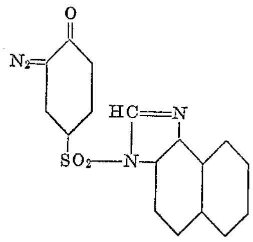

or

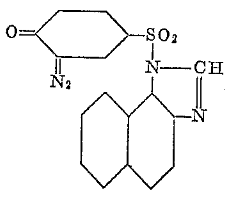

(20) N - (benzoquinone - (1,2) - diazide - (2) - 4 - sulfonyl)-N-(β-phenoxy-ethyl)-aniline

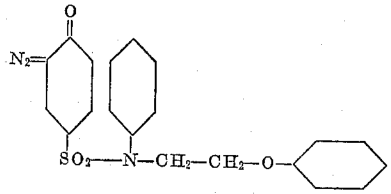

(21) N - (benzoquinone - (1,2) - diazide - (2) - 4 - sulfonyl)-N-phenyl-benzylamine

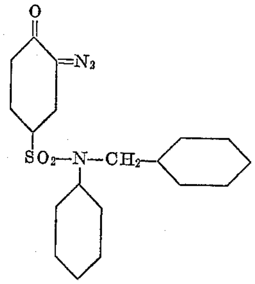

(22) N - (benzoquinone - (1,2) - diazide - (2) - 4 - sulfonyl)-2'-amino-diphenylene oxide

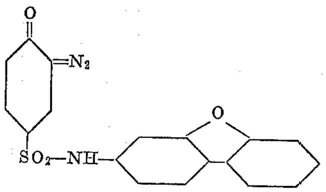

These diazo compounds are not described in the literature and the new diazo compounds in themselves form part of the present invention. They may be prepared, for example from the amino-hydroxy-benzene-sulfonic acids. After blocking the hydroxyl group and the amino group by converting the starting material to the corresponding benzoxazolone, the latter is heated with phosphorous pentachloride to convert it to the corresponding sulfochloride. The benzoxazolone sulfochloride is then condensed with an amine; i.e., the chlorine atom is replaced by the base. The benzoxazolone sulfonamide is saponified with dilute sodium hydroxide to the amino - hydroxy - benzene - sulfonamide. When diazotizing the latter bases it is advisable (since they are very difficult to dissolve in dilute salt solutions) to add solvents which are miscible with water, for example dioxane.

Another method is to prepare sulfonic acid chlorides from benzoquinone-(1,2)-diazide-sulfonic acids by treatment with chlorosulfonic acid and react them with amino compounds in an alkaline medium whereby sulfonic acid amides are formed.

It is of advantage to select the residues, which are introduced into the molecule by amidation so that the diazo compounds formed are either of low solubility or insoluble in water. The printing properties of this group of quinone-diazides may be further improved by the introduction of more substituents, preferably hydrocarbon radicals, into the benzene nucleus. Derivatives with a substituent in the 6-position of the benzene nucleus are of special advantage.

The following examples are inserted merely for the purpose of illustrating the above described process without any intention of restricting the scope of the invention.

(1) 0.4 g. of the diazo compound of 2-amino-1-hydroxy-benzene-4-(N,N-diphenyl)-sulfonamide (No. 1 in the above table) and 0.2 g. of a formaldehyde-phenol-resin-novolak, sold in Germany under the name "Alnovol" (registered trademark in Germany), are dissolved in 20 cc. of glycolmonomethylether.

The clear, deeply yellow-colored solution is whirl-coated onto an aluminum plate the surface of which has been mechanically roughened. Thereafter the plate is dried with the aid of an electrical drier.

The coated aluminum plate is then exposed to light under a positive master and the positive image is made ready for printing by treatment with a 3% aqueous solution of trisodium phosphate and subsequently treatment with a 5% aqueous solution of phosphoric acid.

After rubbing in with black greasy ink the image is excellent suited for the printing of a large run of copies.

The diazo compound used in this example may be prepared in the following manner:

(*a*) 76 g. of 2-amino-1-hydroxy-benzene-4-sulfonic acid are dissolved in 240 cc. of water with the addition of 48 g. of anhydrous sodium carbonate. While stirring at a temperature of 10–20° C., phosgene is added to this solution until the reaction mixture has become Congo-acid and practically no amino-sulfonic acid can be determined any longer by diazotization. The benzoxazolone-5-sulfonic acid obtained as a crystalline mass (compare German Patent No. 188,378, printed in Friedländer, "Fortschritte der Teerfarbenfabrikation," volume VIII (1905/07), page 1359) is recrystallized from a smaller quantity of boiling water. Yield 71 g.

(*b*) 54 g. of benzoxazolone-5-sulfonic acid (dried at a temperature of 120° C.) and 53 g. of phosphorus pentachloride are finely triturated and intimately mixed. The mixture is heated, using an open pipe, on the oil bath to 120° C. for 3–4 hours. The content of the retort is digested with ice water, filtered and washed with water several times. After thoroughly drying the thus obtained raw benzoxazolone-5-sulfochloride of the formula

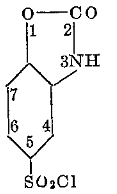

it is dissolved in a large quantity of ether, separated of solid impurities by filtration and the ether is evaporated. Yield 36.8 g. Melting point 212–214° C. under decomposition.

(*c*) 40 g. of benzoxazolone-5-sulfochloride and 62 g. of diphenylamine are finely triturated and intimately mixed and then heated on the oil bath to 150° C. The resulting melt, boils setting free hydrochloric acid gas and soon solidifies. The decomposition product is dissolved in a minimum quantity of boiling alcohol and the solution is treated with charcoal while hot. On cooling the benzoxazolone-5-(N,N-diphenyl)-sulfonamide crystallizes out in the form of nearly colorless small needles. Yield 44 g. Melting point 208–209° C.

(*d*) In order to saponify the oxazolone, 44 g. of the recrystallized, powder reaction product described under (*c*) are heated with 560 cc. of 20% sodium hydroxide to the boiling point for 3 hours under reflux condensation. The 2 - amino - 1 - hydroxy - benzene - 4 - (N,N - diphenyl)-sulfonamide formed in the alkaline liquid is converted into the hydrochloride by addition of about 360 cc. of 32% hydrochloric acid.

(*e*) The hydrochloride obtained according to the procedure described under (*d*) is not isolated but the reaction mixture is transformed into a clear solution by addition of 760 cc. of dioxane and 40 cc. of 32% hydrochloric acid. To this solution there are added slowly, under cooling with ice, 36 cc. of a 2n-solution of sodium nitrite. The diazo compound of 2-amino-1-hydroxy-benzene-4-(N,N-diphenyl)-sulfonamide precipitates in the form of deeply yellow-colored platelets. It is filtered off and washed with water several times. Yield 28 g. When heated in a capillary tube, this diazo compound begins darkening at 110° C. and melts at about 190° C. with charring.

(2) In an analogous manner to the method described in Example 1 an aluminum plate is sensitized with a 2% solution of the diazo compound of 2-amino-1-hydroxy-benzene-4-[N-ethyl-N-(*β*)-naphthyl]-sulfonamide (No. 2 in the above table) in a solvent mixture of monomethylglycol and methylethylketone (1:1). Images suitable for printing plates may be obtained as described in Example 1, from the light-sensitized plate which is characterized by a very good shelf-life.

The diazo compound is prepared in the following manner:

(*a*) 23 g. of benzoxazolone-5-sulfochloride, prepared as described in Example 1, are dissolved in 200 cc. of dioxane and added to a solution of 17 g. of N-ethyl-N-(*β*)-naphthyl-amine in 50 cc. of pyridine by shaking. After heating the mixture on a steam bath for about 10 minutes an oily substance precipitates which crystallizes after standing for some hours. The dioxane solution is filtered off from the precipitate (pyridinehydrochloride) and evaporated under reduced pressure to a sirup-like mass. On digesting the evaporation residue with 100 cc. of an 8% sodium hydroxide solution while it is slightly heated to approximately 35° C. for a short time, a fine crystalline mass results, which, after the addition of 300 cc. of water, dissolves gradually with heat. This alkaline solution is cautiously acidified with concentrated hydrochloric acid at about 30° C. (pH approx. 3) and benzoxazolone-5-[N-ethyl-N-(*β*)-naphthyl]-sulfonamide is obtained as a crystalline precipitate. The raw product is purified by recrystallizing from a mixture of 4 parts of alcohol and 6 parts of water. Yield 20 g. Melting point 160–163° C.

(*b*) In order to saponify the oxazolone obtained according to the procedure described under (*a*), 20 g. of the product is heated with 200 cc. of a 20% sodium hydroxide solution on a steam bath for 1 hour. The saponification product, which has precipitated as an oily substance, dissolves gradually on diluting the alkaline liquid with water. After acidifying with 16% hydrochloric acid the hydrochloride of 2-amino-1-hydroxy-benzene-4-[N-ethyl-N-(*β*)-naphthyl]-sulfonamide precipitates partially.

(*c*) For the preparation of the diazo compound the hydrochloride obtained according to the procedure described under (*b*) is again dissolved without isolation by diluting the acid liquid with water to about 2 liters. The dissolved product is filtered when hot, in the presence of activated charcoal and after cooling down to 15° C. and after the addition of 30 cc. of 32% hydrochloric acid, it is diazotized with 30 cc. of a 2n-solution of sodium nitrite, which is slowly added dropwise while stirring. The diazo compound of 2-amino-1-hydroxy-benzene-4-[N-ethyl-N-(*β*)-naphthyl]-sulfonamide separates out in the form of fine, yellow-colored crystals. After filtering with suction the diazo compound is washed thoroughly with water and dried on clay. Yield 13 g. On heating in a capillary tube the diazo compound starts turning red at about 115° C. and blackens at about 190° C. while melting.

(3) 0.2 g. of the diazo compound of N,N′-di-[2-amino-1-hydroxy-benzene-4-sulfonyl]-benzidine (No. 3 in the above table) and 0.1 g. of "Alnovol" (compare Example 1) are dissolved in a mixture of 15 cc. of glycolmonomethylether and 5 cc. of dioxane by heating to 40° C. An aluminum foil is coated with this solution as described in the aforegoing examples. After exposure to light the copy is wiped over for several times with a 10% solution of disodium phosphate and subsequently with a 1% solution of phosphoric acid and thus made ready for printing.

The diazo compound is prepared in the following manner:

(*a*) A solution of 20 g. of benzoxazolone-5-sulfochloride in 200 cc. of dioxane is mixed, while stirring, with a solution of 6 g. of benzidine in 150 cc. of dioxane and 7 cc. of pyridine. An emulsion results which gradually turns weakly red and from which, after a brief heating on a steam bath, a half-solid, weakly red-colored mass separates out. After standing for some hours the clear dioxane solution is decanted, the residue is washed with some dioxane and triturated and intimately mixed with highly diluted hydrochloric acid (Congo-acid reaction). The raw N,N'-di-(benzoxazolone-5-sulfonyl)-benzidine obtained as fine crystals is filtered off and washed with water several times. Yield 18 g. The compound decomposes at about 300° C. under blackening and is very difficultly soluble in the usual solvents.

(*b*) The hydrochloride of N,N'-di-(2-amino-1-hydroxy-benzene-4-sulfonyl)-benzidine is prepared in an analogous manner as described in Example 2 under (*b*) by saponifying the oxazolone and subsequently it is diazotized according to the procedure described in Example 2 under (*c*). The diazo compound starts darkening slowly at temperatures above 200° C. without melting.

(4) 0.2 g. of the diazo compound of the N',N''-di-(2-amino - 1 - hydroxy - benzene-4-sulfonyl)-4',4''-diamino-benzophenone (No. 4 in the above table) is dissolved in a mixture of 5 cc. of isopropylalcohol and 5 cc. of methylethylketone. An aluminum foil is coated with this solution and an image is made in the manner described in the aforegoing examples. After development with a 10% solution of disodium phosphate and subsequent treatment with a 1% solution of phosphoric acid a positive printing plate is obtained from a positive master.

The diazo compound is prepared in the following manner:

25 g. of benzoxazolone-5-sulfochloride (compare Example 1) are dissolved in 220 cc. of dioxane and mixed, by shaking, with a solution of 10.6 g. of 4,4'-diamino-benzophenone in 100 cc. of pyridine. After a brief heating of this mixture on a steam bath a red-brown oil precipitates. The dioxane solution is decanted after standing for some hours and the sirup-like precipitate is washed with dioxane and dissolved in the necessary quantity of an 8% sodium hydroxide solution. On cautiously acidifying the alkaline liquid with concentrated hydrochloric acid while cooling with ice the N',N''-di-(benzoxazolone-5-sulfonyl)-4',4''-diamino - benzophenone precipitates as a tenacious mass which, however, decomposes quickly in the form of crystals. The precipitate is filtered off and washed with water. Yield 22 g. The compound melts at temperatures between 175°–225° C. under decomposition.

Saponification of the oxazolone and subsequent diazotization of the N',N''-di-(2-amino-1-hydroxy-benzene-4-sulfonyl)-4',4''-diamino-benzophenone are carried out in analogous manner to the methods described in Example 2 and Example 3 respectively. The diazo compound starts turning red-brown at about 100° C. and blackens on further heating while vitrifying.

(5) An aluminum foil is coated with a solution of 0.2 g. of the diazo compound of N,N'-di-(2-amino-1-hydroxy-benzene - 4 - sulfonyl) - N,N' - dimethyl - p - phenylene-diamine (No. 5 in the above table) and 0.1 g. of "Alnovol" (compare Example 1) in 10 cc. of a mixture of 5 cc. of glycolmonomethylether and 5 cc. of methylethyl-ketone. From this sensitized foil which is characterized by a good shelf-life, positive printing plates can be made as described in the aforegoing examples.

The diazo compound is prepared according to the procedure described in Example 2 with only some minor alterations. The N,N'-(benzoxazolone-5-sulfonyl)-N,N'-dimethyl-p-phenylene-diamine which results as the first step of the procedure yields a weakly pink-colored crystalline powder.

The diazo compound obtained from N,N'-dimethyl-p-phenylene-diamine as a yellow crystalline powder starts changing color, on heating in a capillary tube, at about 140° C., at first to red, then to black, and thereafter it chars without melting.

(6) 0.2 g. of the diazo compound of N,N'-di-(2-amino-1 - hydroxy -benzene - 4 - sulfonyl) - N,N' - dimethyl-benzidine (No. 6 in the above table) and 0.1 g. of "Alnovol" (compare Example 1) are dissolved in a mixture of 10 cc. of glycolmonomethylether and 15 cc. of methylethylketone. This solution is whirlcoated in the usual manner onto an aluminum plate which is anodically oxidized on one side. After the exposure to light under a transparent master the copies are developed to images ready for printing by briefly bathing in a 3% solution of trisodium phosphate and then treating with a 1% solution of phosphoric acid.

The diazo compound is prepared as described in Example 2. N,N'-dimethyl-benzidine is caused to react with benzoxazolone-5-sulfochloride in dioxane, whereby the N,N' - di - (benzoxazolone - 5 - sulfonyl) - N,N' - dimethyl-benzidine results. The compound starts melting at about 300° C. under charing.

The N,N' - di - (2 - amino - 1 - hydroxy - benzene - 4-sulfonyl)-N,N'-dimethyl-benzidine is obtained from the oxazolone by saponification according to the description given in Example 2.

When diazotizing the amino-hydrochloride it is advisable to use dioxane as an additional solvent. The diazo compound precipitates in the form of fine yellow crystals. On heating in a capillary tube it starts darkening at 150° C. and chars slowly.

(7) 0.2 g. of the diazo compound of 2-amino-5-methyl-1-hydroxy-benzene-4-(N,N-diphenyl)-sulfonamide (No. 7 in the above table) is dissolved in a mixture of 5 cc. of propyl-alcohol with 5 cc. of dioxane. An aluminum foil is coated with this solution in the usual manner. After the well-known treatment of these sensitized foils images can be obtained which, after being treated with disodium phosphate and phosphoric acid may be used as printing plates.

The diazo compound is manufactured from 5-methyl-2-amino-1-hydroxy-benzene-4-sulfonic acid as starting material which is, as described in Example 1, converted into the diazo compound of 2-amino-5-methyl-1-hydroxy-benzene-4-(N,N'-diphenyl)-sulfonamide. Yield 6 g. of crystalline yellow precipitate. The diazo compound starts turning red at about 135° C. and melts at approximately 175°–185° C. under blackening.

(8) As described in Example 7, an aluminum foil is sensitized with the diazo compound of 2-amino-5-methyl-1-hydroxy-benzene-4-(N-methyl-N-p-tolyl) - sulfonamide (No. 8 in the above table). From this light-sensitive material printing plates can be made in the usual manner.

The diazo compound is obtained by the following procedure:

(*a*) 12.4 g. of 6-methyl-benzoxazolone-5-sulfochloride are dissolved in 100 cc. of dioxane and this solution is mixed with 13 cc. of p-N-methyl-amino-toluene. After standing for some hours the mixture is evaporated under reduced pressure to a sirup-like mass. On digesting this sirupy residue with a 10% sodium hydroxide solution the sodium compound of the 6-methyl-benzoxazolone-5-(N-methyl-N-p-tolyl)-sulfonamide of the formula

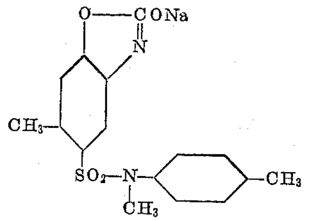

is obtained in the form of white, shining little crystals which, after being filtered with suction, are purified by washing out the adhering p-methyl-amino-toluene with ether. Yield 15 g. Melting point 101–103° C.

(*b*) 15 g. of the sodium salt mentioned in the foregoing paragraph (*a*) are heated with 150 cc. of a 20% solution of sodium hydroxide on a steam bath for one hour. The saponification product precipitates as an oil substance and is caused to dissolve by diluting the alkaline liquid with water to about 1 liter. After being acidified with concentrated hydrochloric acid the boiling solution is treated with charcoal. On cooling a small amount of the hydrochloride of 2-amino-5-methyl-1-hydroxy-benzene-4-(N-methyl-N-p-tolyl)sulfonamide crystallizes in the form of platelets.

The diazo compound decomposes at temperatures between 98° and 104° C.

(9) 0.2 g. of the diazo compound of 2-amino-6-methyl-1-hydroxy-benzene-4-(N,N-diphenyl)-sulfonamide (No. 9 in the above table) is dissolved in 10 cc. of glycolmonomethylether. An aluminum foil, which has been etched on one side with ferric chloride, is sensitized on the side so treated with the solution mentioned before. After exposure to light under a master the sensitized surface is wiped over several times at first with a 3%, later on with a 5% solution of trisodium phosphate and thereafter it is treated with a 5% solution of phosphoric acid. A positive plate ready for printing is obtained which is characterized by an excellent capability of taking up greasy printing ink.

For the manufacture of the diazo compound 2-amino-6-methyl-1-hydroxy-benzene-4-sulfonic acid is used as starting material. In manner analogous to Example 1 this compound is converted into the diazo compound of the formula given under No. 9 in the above table, the corresponding benzoxazolone-sulfonic acid, the sulfochloride and sulfonamide thereof and the amino-methyl-hydroxy-benzene - (N,N - diphenyl) - sulfonamide being obtained as the respective intermediate products. The diazo compound is a yellow, fine-crystalline precipitate which is purified by filtering and washed with water. It is dried on clay. On heating, it turns red-brown and decomposition takes place at about 132° C.

(10) A 2% solution of the diazo compound of 2-amino-6-methyl-1-hydroxy-benzene-4-(N-methyl-N-p-tolyl)-sulfonamide (No. 10 in the above table) in monomethyl-glycolether, which contains 1% of "Alnovol" (compare Example 1), is whirlcoated onto an aluminum foil. From the thus sensitized foil printing plates can be made in the same manner as described in the foregoing examples.

The diazo compound is obtained in the following manner:

A solution of 23 g. of 7-methyl-benzoxazolone-5-sulfochloride in 185 cc. of dioxane is mixed with 24.4 cc. of p-N-methyl-amino-toluene. After standing for several hours, crystals of the hydrochloride of the p-methylamino-toluene have separated which are filtered with suction and washed with some dioxane. The combined filtrates are evaporated under reduced pressure to a sirup-like mass. On digesting the precipitate with concentrated hydrochloric acid while cooling with ice the 7-methyl-benzoxazolone-5-(N-methyl-N-p-tolyl)-sulfonamide is obtained in the form of a weakly brown-colored, fine-crystalline precipitate. Purification of the raw product is effected by filtering off the crystal mass, washing it with water and recrystallizing it from alcohol with the addition of charcoal. Yield 25 g. Melting point 206°–207° C.

The oxazolone sulfonamide is saponified to 2-amino-6-methyl-1-hydroxy-benzene-4-(N-methyl-N-p - tolyl) - sulfonamide. This is transformed into its hydrochloride from which, in analogous manner to Example 1, the diazo compound can be prepared. The thus obtained diazo compound forming as yellow crystals decomposes at 130° C.

(11) 0.1 g. of the diazo compound of 4-chloro-2-amino-1-hydroxy-benzene-6-(N-phenyl)-sulfonamide (No. 11 in the above table) is dissolved together with 0.05 g. of shellac in 6 cc. of glycolmonomethylether and an aluminum foil is sensitized with the filtered solution in the usual manner. The image obtained by exposing the light-sensitive foil to light under a positive master is wiped over thoroughly with a 10% solution of disodium phosphate and, after brief washing with water, it is treated with a 5% solution of phosphoric acid. After rubbing in with greasy ink, a positive printing plate is obtained.

The diazo compound is obtained in an analogous manner to Example 1:

From 4 - chloro - 2 - amino - 1 - hydroxy - benzene-7-sulfonic acid there is prepared by reaction with phosgene, 5-chlorobenzoxazolone-7-sulfonic acid. By adding phosphorus pentachloride, 6-chloro-benzoxazolone-7-sulfochloride is obtained therefrom (melting point 198° C. under decomposition). From the 5-chloro-benzoxazolone-7-sulfochloride, 5-chloro-benzoxazolone-7-(N-phenyl)-sulfonamide is prepared by reaction with freshly distilled aniline (melting point of the sulfonamide 233°–234° C.). The 5-chloro-benzoxazolone-7-(N-phenyl)-sulfonamide is subjected to diazotization after having been saponified to 4-chloro-2-amino-1-hydroxy-benzene-6-(N-phenyl)-sulfonamide and this amino compound in the form of its hydrochloride is subjected to diazotization. The diazo compound of 4-chloro-2-amino-1-hydroxybenzene-6-(N-phenyl)-sulfonamide is obtained in the form of a yellow precipitate which melts at 140° C. under decomposition.

Instead of the diazo compound described above, the diazo compound of 4-chloro-2-amino-1-hydroxy-benzene-6-[N-(β)-naphthyl]-sulfonamide (No. 12 in the above table), prepared analogously may be used. The 5-chloro-benzoxazolone-7-[N-(β)-naphthyl]-sulfonamide melts at 208°–216° C. The diazo compound, which is difficutly soluble in water, melts at 95° C., the melting taking place while the compound is turning red and decomposing.

The diazo compound obtained from 4-chloro-2-amino-1 - hydroxy - benzene - 6 - (N - ethyl N - phenyl) -sulfonamide (No. 13 of the table) may be used with the same good result.

By reaction of 5-chloro-benzoxazolone-7-sulfo-chloride with N-ethyl-aniline in dioxane there is obtained 5-chlorobenzoxazolone - 7 - (N - ethyl - N - phenyl) - sulfonamide which melts at 217°–220° C. The saponification is carried out in the usual manner and the sodium salt of the 4-chloro-2-amino-1-hydroxy-benzene-6-(N-ethyl-N-phenyl)-sulfonamide precipitates as an oily substance during heating and forms a crystalline mass after cooling.

Diazotization of this sodium salt is effected in the following manner:

12 g. are dissolved in 500 cc. of water. The hot solution is treated with charcoal and mixed with 40 cc. of a 2n-solution of sodium nitrite. To this solution, 16% hydrochloric acid is slowly added dropwise under constant intense stirring while cooling from room temperature with ice until a heavily positive reaction on Congo-paper is observed. The diazo compound precipitates as a yellow substance. After stirring for two more hours under cooling with ice it is isolated in the usual manner. Yield 11 g. On heating the diazo compound begins to darken at 120° C. and melts at about 210° C. under blackening.

(12) A paper foil which is manufactured according to U.S. Patent No. 2,534,588 and which paper foil is coated on one side with a formaldehyde-hardened layer consisting of casein and clay, is whirlcoated on its coated side with a 2% solution of the diazo compound listed as No. 3 in the above table dissolved in glycolmonomethylether and subsequently thoroughly dried by means of warm air. Thereafter the sensitized foil is exposed to light under a positive master. A yellow-brown image on a red-brown background is obtained which is tamponed for approximately one minute with a 5% solution of disodium phosphate and subsequently wiped over with a 1% solution of phosphoric acid. On rubbing in with greasy printing ink a positive image results which may be used for printing in one of the usual printing machines.

(13) 0.2 g. of the diazo compound listed as No. 14 in the above table are dissolved in a mixture consisting of 5 cc. of glycolmonomethylether and 5 cc. of dioxane. A thoroughly hard-sized paper, which is coated on one side with hardened gelatin, is coated on the gelatinized side with this solution and thoroughly dried. The sensitized paper is exposed to light under a master. The exposed sensitized side is rubbed in with greasy printing ink and subsequently tamponed with a 5% solution of disodium phosphate. A positive image containing greasy ink is obtained on a clear white background which is hardened by a brief treatment with dilute phosphoric acid.

The diazo compound listed as No. 14 is prepared in the following manner:

3 moles of benzoxazolone-5-sulfochloride are caused to react with 1 mole of 4,4'-diamino-2,5,2',5'-tetramethyl-tri-phenylmethane in dioxane, to which pyridine is added. The oxazolone rings of the thus obtained N',N''-di-(benzoxazolone - 5 - sulfonyl) - 4',4'' - diamino - 2',5',2'',5''-tetramethyl-triphenyl-methane are split up by heating with an approximately 20% solution of caustic soda at water bath-temperature. On acidifying the alkaline liquid with hydrochloride of the N'N''-di-(2-amino-1-hydroxybenzene - 4 - sulfonyl) - 4',4'' - diamino - 2',5',2'',5''-tetramethyltriphenylmethane precipitates and it is diazotized with sodium nitrite in the form of a suspension in hydrochloric acid. The yellow-colored, very fine-grained bis-diazo compound decomposes gradually without melting on heating in a capillary tube to temperatures above 100° C.

(14) A paper foil as described in Example 12 is coated with a 1.5% solution of the diazo compound of the Formula No. 15, dissolved in glycolmonomethylether and the coated side is thoroughly dried. After exposure to light under a positive master the coated side is treated with a 10% solution of disodium phosphate for approximately 2 minutes, rinsed with water and wiped over with a 1% solution of phosphoric acid. The positive image is rubbed in with greasy ink and used as a printing plate.

The diazo compound is prepared in the following manner:

1.2 moles of benzoxazolone-5-sulfochloride are caused to react with 1 mole of 2-amino-fluorene in dioxane containing pyridine. After recrystallization from glacial acetic acid the benzoxazolone-5-(N-2'-fluorenyl)-sulfonamide obtained in this manner melts at 282° C. under decomposition. The oxazolone ring is split up by heating in a 20% solution of caustic soda. The hydrochloride of the 2-amino-1-hydroxy-benzene-4-(N-2'-fluorenyl)-sulfonamide obtained after acidification with hydrochloric acid is suspended and diazotized in suspension by means of sodium nitrite. The diazo compound decomposes at approximately 210° C.

(15) Vegetable parchment is coated with a solution of 0.2 g. of the diazo compound listed at No. 16 in 10 cc. of dioxane and, after the coated side has been thoroughly dried, the sensitized paper is exposed to light under a positive transparent master. The exposed layer is developed with a 10% solution of disodium phosphate and treated briefly with dilute phosphoric acid. Thereafter the positive image obtained may be rubbed in with greasy printing ink.

The diazo compound listed as No. 16 is prepared in the following manner:

2.2 moles of benzoxazolone-5-sulfochloride are condensed with 1 mole of 4',4''-diamino-diphenyl-(1',1'')-cyclohexane in an analogous manner to that described in Example 18. Conversion of the condensation product into N',N''-di-(2-amino-1-hydroxybenzene-4-sulfonyl)-4',4''-diaminodiphenyl-(1',1'')-cyclohexane as well as diazotization of the base are also performed in an analogous manner to the same example. On heating in a capillary tube the diazo compound chars slowly above 100° C. without melting.

(16) 0.2 g. of the diazo compound of 1-hydroxy-2-amino - 6 - methylbenzene - 4 - sulfone - (N - diphenyl)-amide (No. 9) are dissolved in 10 cc. of glycolmonomethylether. A paper foil of the kind described in Example 12 is coated on one side with this solution. The sensitized foil is exposed to light under a master, using an arc lamp, developed with a 5% solution of disodium phosphate and subsequently treated with dilute phosphoric acid for a short while. A positive image will result which may be rubbed in with greasy printing ink.

(17) 2.2 parts by weight of benzoquinone-(1,2)-diazide-(2)-4-sulfochloride are added to a solution of 1.2 parts by weight of benzimidazole in 13 parts by volume of pyridine, whereupon condensation occurs. The yellow crystallized condensation product melts at a temperature of 151° C. under decomposition and corresponds to Formula 17.

A 1% solution of the diazo compound corresponding to Formula 17 in a mixture of diamethyl formamide and glycol monomethyl ether (2:1) is coated onto a roughened aluminum foil by means of a plate whirler. After thoroughly drying the layer thus formed, the foil is exposed to light under a positive pattern. The exposed layer is developed with a 5% disodium phosphate solution, and the developed layer is then treated with 1% phosphoric acid. A positive image of the pattern is obtained which is rubbed in with greasy ink, whereupon the foil may be used for the production of copies.

(18) 4.4 parts by weight of benzoquinone-(1,2)-diazide-2-4-sulfochloride are added while stirring to a solution of 2.6 parts by weight of 2-methyl-benzimidazole in 26 parts by volume of pyridine. While the temperature of the reaction mixture rises, condensation occurs. After stirring for 5 minutes, the solution is mixed with 50 parts by volume of water and cooled with ice. The condensation product crystallizes out. It is recrystallized from alcohol and forms orange-yellow leaflets having a melting point of 126° C. The product corresponds to Formula 18.

A 1% solution of the diazo compound corresponding to Formula 18 in a mixture of dimethyl formamide and glycol monomethyl ether (2:1) is coated on a roughened aluminum foil by means of a plate whirler. After thoroughly drying the layer thus formed, the light sensitized foil is exposed to light under a positive pattern. After developing the exposed foil with a 5% disodium phosphate solution, a positive image is obtained which is treated with a 1% phosphoric acid and then inked with greasy ink. The foil may now be used for producing positive copies of the pattern.

(19) 3.2 parts by weight of benzoquinone-(1,2)-diazide-(2)-4-sulfochloride are added to a solution of 2.5 parts by weight of naphtho-1',2':4,5-imidazole in 20 parts by volume of pyridine. The reaction mixture is stirred for 15 minutes, then 40 parts by volume of water are added to the solution. After cooling the solution, preferably in an ice-bath, the condensation product precipitates. After recrystallization from dioxane, it forms orange-yellow crystals which melt at a tempereature of 130° C. under decomposition. The condensation product corresponds to Formula 19.

A 1% solution of the diazo compound corresponding to Formula 19 in glycol monomethyl ether is coated on a roughened aluminum foil by means of a plate whirler and the layer thus formed is first dried with warm air and then at a temperature of 80–90° C. The light sensitive foil is exposed to light under a transparent positive pattern. A 0.25% trisodium phosphate solution is used for the development of the exposed foil. The developed foil is rinsed with water and then wiped over with a 1% phosphoric acid. The positive image of the pattern thus obtained is inked with greasy ink, and the foil may now be used as a printing plate for the production of positive copies.

(20) 2.8 parts by weight of N-($\beta$-phenoxy-ethyl)-aniline, prepared by reacting the toluene sulfonyl ester of glycol-phenyl ether with aniline, are dissolved in 20 parts by volume of pyridine and the reaction mixture is then mixed with 3 parts by weight of benzoquinone-(1,2)-diazide-(2)-4-sulfochloride with agitation. The reaction mixture is stirred for another 15 minutes and then 20 parts by volume of water are added. The reaction mixture is cooled down to 0° C., whereupon the reaction product crystallizes. The compound is recrystallized from a benzene/gasoline mixture and decomposes at 110° C. It corresponds to Formula 20.

A 1% solution of the diazo compound corresponding to Formula 20 in glycol monomethyl ether is coated on a roughened aluminum foil by means of a plate whirler, and the coating is dried first with warm air and then at a temperature of 80–90° C. The light sensitized foil is exposed under a transparent positive pattern. A 3% trisodium phosphate solution is used for developing the exposed foil. The positive image thus obtained is rinsed with water, wiped over with a 1% phosphoric acid solution, and inked with greasy ink. The positive printing plate thus obtained is used for making positive copies of the pattern.

(21) The condensation product which is obtained by condensing 1,2,3-benzoxazolone-5-sulfochloride with N-benzylaniline, is saponified with dilute caustic soda solution, and the amino hydroxy compound thus obtained is diazotized in a suspension with dilute hydrochloric acid and 2-n-sodium nitrite solution. The yellow colored diazo compound, which corresponds to Formula 21, decomposes at 138° C. after turning dark.

2 parts by weight of the diazo compound corresponding to Formula 21 and 1 part by weight of an alkali-soluble non-hardenable formaldehyde phenol resin are dissolved in 100 parts by volume of glycol monomethyl ether and this solution is coated on a roughened aluminum foil by means of a plate whirler. After drying, the layer thus formed is exposed under a transparent positive pattern. The exposed foil is developed with a 2% trisodium phosphate solution and a positive image is obtained. After treating the developed foil with a 1% phosphoric acid solution and inking with greasy ink, the foil is finished for use in printing.

(22) 0.1 g. of the diazo compound conforming to the formula listed as No. 22 in the above table together with 0.05 g. of the alkali-soluble formaldehyde-phenol-resin mentioned in Example 1 with its trade name "Alnovol" are dissolved in 5 cc. of ethylene glycol monomethyl ether and the solution thus obtained is coated on a roughened aluminum foil. After thoroughly drying the sensitized foil is exposed under a transparent positive original to the light emitted by an arc lamp of 18 amps. located for example at a distance of about 70 cm. In order to develop the image formed in the coating of the foil the exposed foil is treated with a 0.5% aqueous trisodium phosphate solution. Then the foil is rinsed with water, wiped over with a 1% aqueous phosphoric acid and finally inked up with greasy ink. Thus a positive printing plate is obtained from a positive master.

The diazo compound conforming to formula 22 is prepared as follows:

3 gs. of benzoquinone-(1,2)-diazide-(2)-4-sulfochloride are dissolved in 30 cc. of dioxane. While stirring this solution at normal temperature a solution is slowly added drop by drop which has been obtained by dissolving 2.3 gs. of 2-amino-diphenylene oxide in a mixture of 1.5 cc. of pyridine and 50 cc. of dioxane. After 2 to 3 hours of reaction, water is added to the reaction mixture and the yellow reaction product is precipitated thereby. The precipitate is separated by means of a suction pump, washed with water and dried. It melts unsharp in the neighbourhood of 120° C. without showing a distinct melting-point.

This application is a continuation-in-part of application Serial No. 517,086, filed June 21, 1955, which is, in turn, a continuation-in-part of application Serial No. 238,369, filed July 24, 1951, and now abandoned.

What is claimed is:

1. A compound having the formula

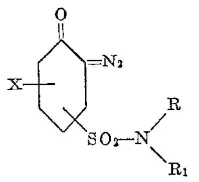

in which R is selected from the group consisting of hydrogen, an alkyl group and an aryl group, R is selected from the group consisting of an aryl group and an aralkyl group, and a group which taken together with N and R forms an imidazole ring, and X is selected from the group consisting of hydrogen, halogen, and lower alkyl.

2. A compound having the formula

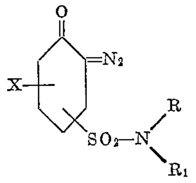

in which R and $R_1$ are aryl and X is selected from the group consisting of hydrogen, halogen, and lower alkyl.

3. A compound having the formula

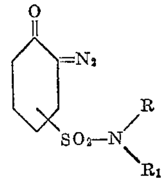

in which R and $R_1$ are aryl.

4. A compound having the formula

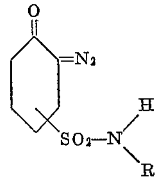

in which R is aryl.

5. A compound having the formula

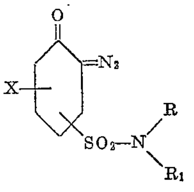

in which R is alkyl, $R_1$ is aryl and X is selected from the group consisting of hydrogen, halogen, and lower alkyl.

6. A compound having the formula

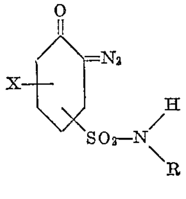

in which R is aryl, and X is selected from the group consisting of hydrogen, halogen, and lower alkyl.

7. A compound having the formula

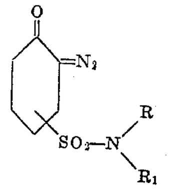

in which R and $R_1$ taken together with N form an imidazole ring.

8. A compound having the formula

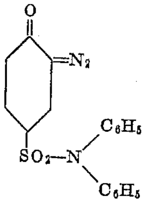

9. A compound having the formula

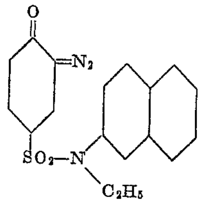

10. A compound having the formula

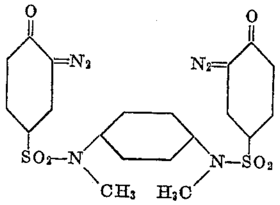

11. A compound having the formula

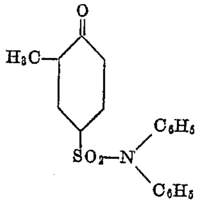

12. A compound having the formula

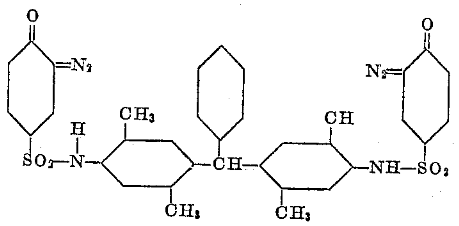

13. A presensitized printing plate comprising a base material having a coating thereon comprising a compound having the formula

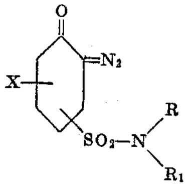

in which R is selected from the group consisting of hydrogen, an alkyl group and an aryl group, R is selected from the group consisting of an aryl group and an aralkyl group, and a group which taken together with N and R forms an imidazole ring; and X is selected from the group consisting of hydrogen, halogen, and lower alkyl.

14. A presensitized printing plate comprising a base material having a coating thereon comprising a compound having the formula

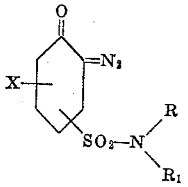

in which R and $R_1$ are aryl and X is selected from the group consisting of hydrogen, halogen, and lower alkyl.

15. A presensitized printing plate comprising a base material having a coating thereon comprising a compound having the formula

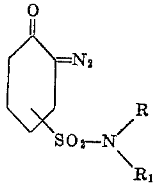

in which R and $R_1$ are aryl.

16. A presensitized printing plate comprising a base material having a coating thereon comprising a compound having the formula

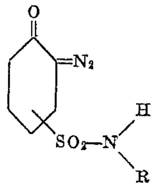

in which R is aryl.

17. A presensitized printing plate comprising a base material having a coating thereon comprising a compound having the formula

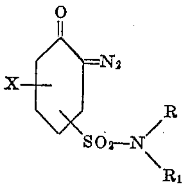

in which R is alkyl, $R_1$ is aryl and X is selected from the group consisting of hydrogen, halogen, and lower alkyl.

18. A presensitized printing plate comprising a base material having a coating thereon comprising a compound having the formula

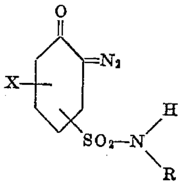

in which R is aryl, and X is selected from the group consisting of hydrogen, halogen, and lower alkyl.

19. A presensitized printing plate comprising a base material having a coating thereon comprising a compound having the formula

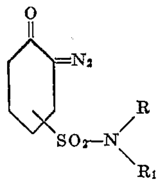

in which R and $R_1$ taken together with N form an imidazole ring.

20. A presensitized printing plate comprising a base material having a coating thereon comprising a compound having the formula

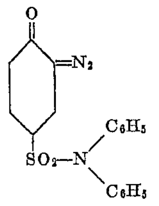

21. A presensitized printing plate comprising a base material having a coating thereon comprising a compound having the formula

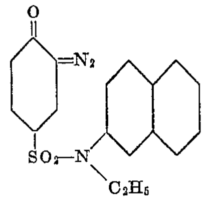

22. A presensitized printing plate comprising a base material having a coating thereon comprising a compound having the formula

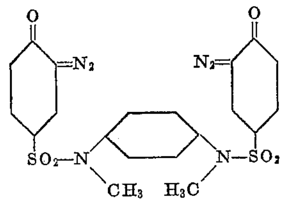

23. A presensitized printing plate comprising a base material having a coating thereon comprising a compound having the formula

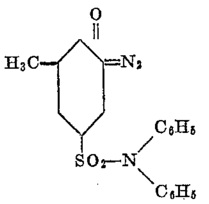

24. A presensitized printing plate comprising a base material having a coating thereon comprising a compound having the formula

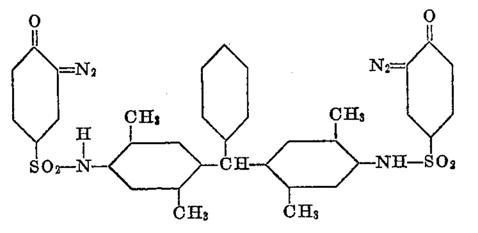

25. A process for developing a printing plate which comprises exposing to light under a master a plate having a compound thereon of the formula

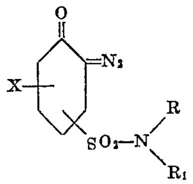

in which R is selected from the group consisting of hydrogen, an alkyl group and an aryl group, R is selected from the group consisting of an aryl group and an aralkyl group, and a group which taken together with N and R forms an imidazole ring; and X is selected from the group consisting of hydrogen, halogen, and lower alkyl; to thereby form a decomposition product in the light struck areas and removing the decomposition product by treatment with a weakly alkaline solution.

26. A process for developing a printing plate which comprises exposing to light under a master a plate having a compound thereon of the formula

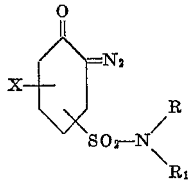

in which R and $R_1$ are aryl and X is selected from the group consisting of hydrogen, halogen, and lower alkyl; to thereby form a decomposition product in the light struck areas and removing the decomposition product by treatment with a weakly alkaline solution.

27. A process for developing a printing plate which comprises exposing to light under a master a plate having a compound thereon of the formula

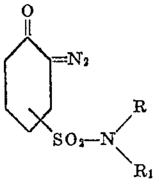

in which R and $R_1$ are aryl; to thereby form a decomposition product in the light struck areas and removing the decomposition product by treatment with a weakly alkaline solution.

28. A process for developing a printing plate which comprises exposing to light under a master a plate having a compound thereon of the formula

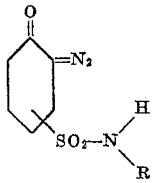

in which R is aryl; to thereby form a decomposition product in the light struck areas and removing the decomposition product by treatment with a weakly alkaline solution.

29. A process for developing a printing plate which comprises exposing to light under a master a plate having a compound thereon of the formula

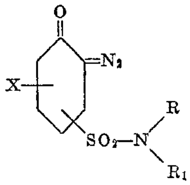

in which R is alkyl, $R_1$ is aryl and X is selected from the group consisting of hydrogen, halogen, and lower alkyl; to thereby form a decomposition product in the light struck areas and removing the decomposition product by treatment with a weakly alkaline solution.

30. A process for developing a printing plate which comprises exposing to light under a master a plate having a compound thereon of the formula

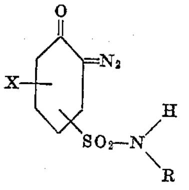

in which R is aryl, and X is selected from the group consisting of hydrogen, halogen, and lower alkyl; to thereby form a decomposition product in the light struck areas and removing the decomposition product by treatment with a weakly alkaline solution.

31. A process for developing a printing plate which comprises exposing to light under a master a plate having a compound thereon of the formula

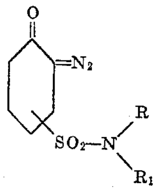

in which R and $R_1$ taken together with N form an imidazole ring; to thereby form a decomposition product in the light struck areas and removing the decomposition product by treatment with a weakly alkaline solution.

32. A process for developing a printing plate which comprises exposing to light under a master a plate having a compound thereon of the formula

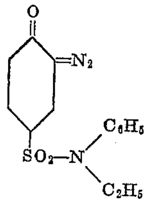

to thereby form a decomposition product in the light struck areas and removing the decomposition product by treatment with a weakly alkaline solution.

33. A process for developing a printing plate which comprises exposing to light under a master a plate having a compound thereon of the formula

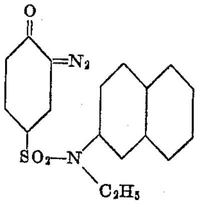

to thereby form a decomposition product in the light struck areas and removing the decomposition product by treatment with a weakly alkaline solution.

34. A process for developing a printing plate which comprises exposing to light under a master a plate having a compound thereon of the formula

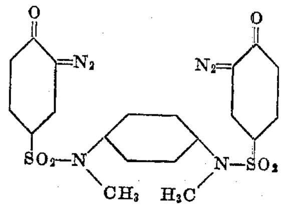

to thereby form a decomposition product in the light struck areas and removing the decomposition product by treatment with a weakly alkaline solution.

35. A process for developing a printing plate which comprises exposing to light under a master a plate having a compound thereon of the formula

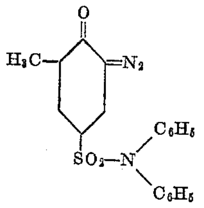

to thereby form a decomposition product in the light struck areas and removing the decomposition product by treatment with a weakly alkaline solution.

36. A process for developing a printing plate which comprises exposing to light under a master a plate having a compound thereon of the formula

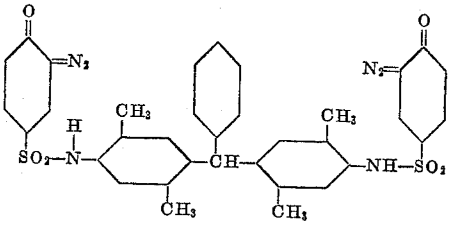

to thereby form a decomposition product in the light struck areas and removing the decomposition product by treatment with a weakly alkaline solution.

37. A compound having the formula

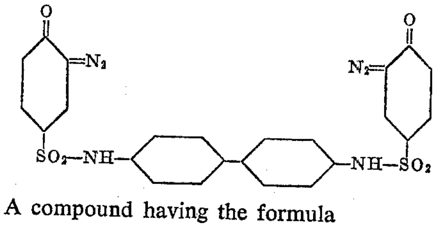

38. A compound having the formula

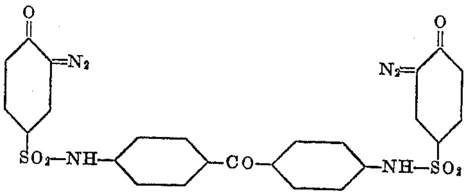

39. A compound having the formula

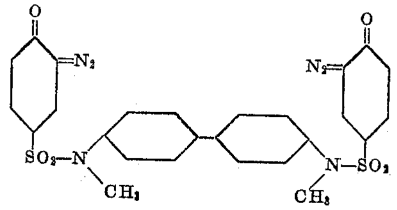

40. A compound having the formula

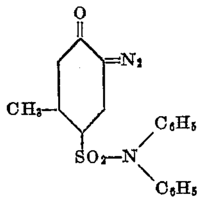

41. A compound having the formula

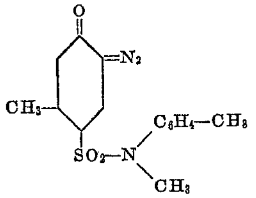

42. A compound having the formula

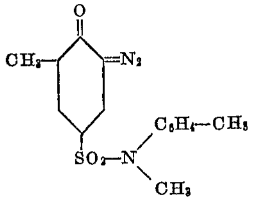

43. A compound having the formula

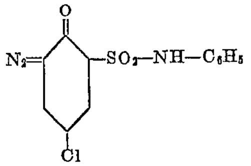

44. A compound having the formula

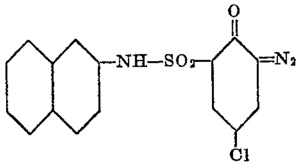

45. A compound having the formula

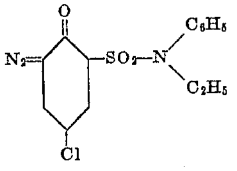

46. A compound having the formula

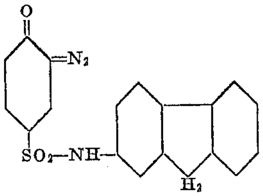

47. A compound having the formula

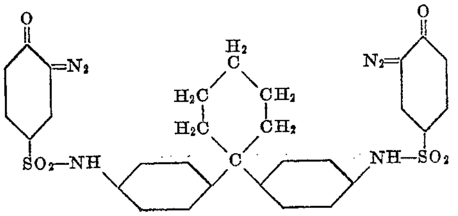

48. A compound having the formula

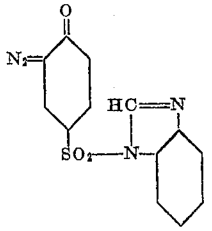

49. A compound having the formula

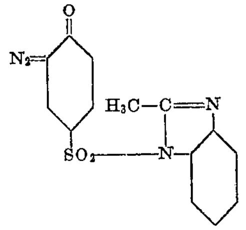

50. A compound having the formula

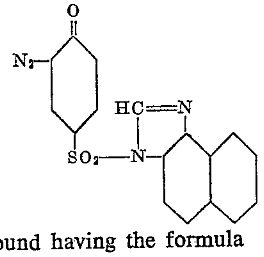

51. A compound having the formula

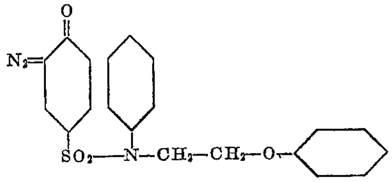

52. A compound having the formula

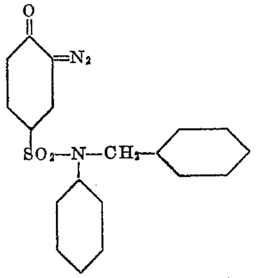

53. A compound having the formula

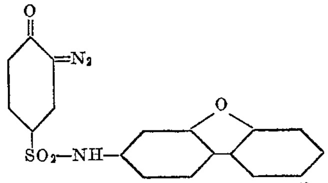

54. A presensitized printing plate according to claim 13 in which the coating contains an alkali-soluble resin.

55. A process according to claim 25 in which the compound is in admixture with an alkali-soluble resin.

References Cited in the file of this patent

UNITED STATES PATENTS

| | | |
|---|---|---|
| 2,702,243 | Schmidt | Feb. 15, 1955 |
| 2,762,243 | Schmidt | Feb. 15, 1955 |

FOREIGN PATENTS

| | | |
|---|---|---|
| 497,135 | Belgium | Aug. 14, 1950 |
| 871,668 | Germany | Mar. 26, 1953 |
| 888,204 | Germany | Aug. 31, 1953 |